(12) United States Patent
Andrade

(10) Patent No.: US 10,343,012 B2
(45) Date of Patent: Jul. 9, 2019

(54) STAIR CLIMBING APPARATUS AND METHOD

(71) Applicant: Cybex International, Inc., Medway, MA (US)

(72) Inventor: Gordon Andrade, Northbridge, MA (US)

(73) Assignee: Cybex International, Inc., Owatonna, MN (US)

( * ) Notice: Subject to any disclaimer, the term of this patent is extended or adjusted under 35 U.S.C. 154(b) by 145 days.

(21) Appl. No.: 15/685,457

(22) Filed: Aug. 24, 2017

(65) Prior Publication Data

US 2017/0348559 A1 Dec. 7, 2017

Related U.S. Application Data

(62) Division of application No. 15/000,380, filed on Jan. 19, 2016, now Pat. No. 9,795,828.

(Continued)

(51) Int. Cl.

| A63B 22/04 | (2006.01) |
| A63B 21/068 | (2006.01) |
| A63B 21/00 | (2006.01) |
| A63B 22/00 | (2006.01) |
| A63B 21/005 | (2006.01) |
| F16B 7/10 | (2006.01) |

(Continued)

(52) U.S. Cl.
CPC ............. *A63B 22/04* (2013.01); *A63B 21/00* (2013.01); *A63B 21/0051* (2013.01); *A63B 21/068* (2013.01); *A63B 21/4034* (2015.10); *A63B 22/00* (2013.01); *A63B 22/0046* (2013.01); *F16B 7/10* (2013.01); *A63B 21/0058* (2013.01); *A63B 21/015* (2013.01); *A63B 21/157* (2013.01); *A63B 22/0023* (2013.01); *A63B 24/0087* (2013.01); *A63B 69/0057* (2013.01); *A63B 71/0622* (2013.01); *A63B 2022/0278* (2013.01)

(58) Field of Classification Search
None
See application file for complete search history.

(56) References Cited

U.S. PATENT DOCUMENTS

| 783,769 | A | * | 2/1905 | Wright | .................... B66B 23/12 |
| | | | | | 198/327 |
| 1,239,077 | A | * | 9/1917 | Begg | ....................... B66B 23/02 |
| | | | | | 198/327 |

(Continued)

FOREIGN PATENT DOCUMENTS

| JP | 2011-56168 | 3/2011 |
| WO | 2015095569 A2 | 6/2015 |

OTHER PUBLICATIONS

Extended European Search Report dated Aug. 3, 2017 in European Application No. 16202055.6.

(Continued)

*Primary Examiner* — Stephen R Crow
(74) *Attorney, Agent, or Firm* — Andrus Intellectual Property Law, LLP

(57) ABSTRACT

A stair stepping apparatus comprising: a plurality of stairs forming a treadmill or endless belt on which a user steps, wherein each stair comprises: a first link comprised of a major step portion joined to a minor riser portion by a rigid elbow, and a second link comprised of major riser portion joined to a minor step portion by a rigid elbow.

13 Claims, 10 Drawing Sheets

Related U.S. Application Data

(60) Provisional application No. 62/193,796, filed on Jul. 17, 2015.

(51) Int. Cl.
  *A63B 24/00* (2006.01)
  *A63B 71/06* (2006.01)
  *A63B 21/015* (2006.01)
  *A63B 69/00* (2006.01)
  *A63B 22/02* (2006.01)

(56) References Cited

U.S. PATENT DOCUMENTS

| | | | | |
|---|---|---|---|---|
| 3,497,215 A * | 2/1970 | Harrison | ............ | A63B 21/154 482/53 |
| 3,592,466 A * | 7/1971 | Parsons | ............ | A63B 22/0023 482/1 |
| 4,687,195 A * | 8/1987 | Potts | ............ | A63B 21/015 482/52 |
| 4,927,136 A * | 5/1990 | Leask | ............ | A63B 22/04 198/323 |
| 5,120,050 A * | 6/1992 | Fowell | ............ | A63B 22/04 482/52 |
| 5,125,877 A * | 6/1992 | Brewer | ............ | A63B 69/0048 482/37 |
| 5,328,420 A * | 7/1994 | Allen | ............ | A63B 22/0023 482/37 |
| 5,556,352 A * | 9/1996 | Chang | ............ | A63B 22/04 482/51 |
| 5,769,759 A * | 6/1998 | Alter | ............ | A63B 22/04 482/37 |
| 6,997,852 B2 * | 2/2006 | Watterson | ............ | A63B 22/0235 482/1 |
| 8,603,017 B2 * | 12/2013 | Trandafir | ............ | A61H 1/001 601/49 |
| 9,238,158 B2 * | 1/2016 | Strommen | ............ | A63B 22/04 |
| 2004/0038779 A1 | 2/2004 | Kuo | | |
| 2012/0238409 A1 * | 9/2012 | Halsey | ............ | A63B 22/04 482/52 |
| 2017/0246500 A1 | 8/2017 | Gatti et al. | | |
| 2017/0348559 A1 | 12/2017 | Andrade | | |
| 2018/0037304 A1 | 2/2018 | Sinclair | | |

OTHER PUBLICATIONS

Int'l. Search Report and Written Opinion dated May 3, 2016 in corresponding Int'l. Patent Appln. No. PCT/US2016/013844.

* cited by examiner

STAIR CLIMBING APPARATUS AND METHOD

RELATED APPLICATIONS

This application is a divisional application of U.S. Ser. No. 15/000,380, filed Jan. 19, 2016 which claims the benefit of priority to U.S. Provisional Application No. 62/193,796 filed Jul. 17, 2015 the disclosures of which are incorporated in their entirety by reference as if fully set forth herein.

This application incorporates by reference the disclosures of all of the following in their entirety as if fully set forth herein: U.S. Pat. No. 783,769, U.S. Pat. No. 3,497,215, U.S. Pat. No. 3,592,466, U.S. Pat. No. 4,687,195, U.S. Pat. No. 4,927,136, U.S. Pat. No. 5769759, U.S. Patent Publication No. 20120238409, U.S. Pat. No. 7,717,831, U.S. Pat. No. 4,725,054, U.S. Pat. No. 7,666,123, U.S. Pat. No. 8,070,658, U.S. Pat. No. 7,278,955, U.S. Pat. No. 8,025,609, U.S. Patent No. 7,727,128, U.S. Pat. No. D486,535, U.S. Pat. No. D490,127, U.S. Patent Publication No. 2003/0092541, U.S. Patent Publication No. 2007/0173384, U.S. Patent Publication No. 2006/0270531, U.S. Patent Publication No. 2008/0167169, U.S. Patent Publication No. 2010/0204021.

FIELD OF THE INVENTION

The present invention relates to machines that provide a stair climbing exercise for a user and more particularly to an escalator or treadmill that mounts a series of interconnected steps that move along a track as the user steps on successive steps.

BACKGROUND OF THE INVENTION

Exercise machines for providing stair-climbing exercises such as U.S. Pat. Nos. 783,769, 3,497,215, 3,592,466, 4,687,195, 4,927,136, 5,769,759, U.S. Patent Publication No. 20120238409 are known.

SUMMARY OF THE INVENTION

In accordance with the invention there is provided a stair stepping apparatus comprising:

a plurality of stairs mounted on a frame and pivotably interconnected to each other in succession to form a treadmill or endless belt on which a user steps, the treadmill or endless belt being rotatably mounted on the frame for rotation around a path of travel having a longitudinal axis, wherein each stair comprises:

a first link comprised of a major step portion joined to a minor riser portion by a rigid elbow, and a second link comprised of major riser portion joined to a minor step portion by a rigid elbow, the major step portion of each first link having a rearwardmost edge pivotably interconnected to a forwardmost edge of the minor step portion of the second link of a successively interconnected stair, the major riser portion of each second link having a rearwardmost edge pivotably interconnected to a forwardmost edge of the minor riser portion of the first link of a successively interconnected stair.

The major step portion of the first link preferably has a generally planar upper surface for receiving a sole of the user's foot, the forwardmost edge of the minor riser portion extending above the generally planar surface of the major step portion, the minor step portion of the second link preferably having a generally planar upper surface for receiving the sole of the user's foot, the rearwardmost edge of the major riser portion extending below the generally planar surface of the major step portion.

The forwardmost edge of the minor riser portion typically extends a selected first normal distance away from a plane coincident with the generally planar surface of the major step portion, the rearwardmost edge of the major riser portion extends a selected second normal distance away from a plane coincident with the generally planar surface of the minor step portion.

The pivotable interconnections of the apparatus described above preferably comprise a male hinge disposed on one of the rearwardmost and forwardmost edges and a female hinge disposed on the other of the rearwardmost and forwardmost edges, the male hinge comprising a curved finger rotatably received within a complementary receiving aperture of the female hinge, the curved finger being adapted to rotate within and completely enclose the receiving aperture to form a continuous exterior surface between the female hinge and the male hinge at all angles of rotation of the male hinge within the receiving aperture.

The selected first normal distance is preferably between about 1 and about 5 inches.

The minor step portion preferably has a minor effective front to back length of between about 1 and about 5 inches.

The selected first normal distance is preferably between about 1 and about 5 inches and the minor step portion has a minor effective front to back length of between about 1 and about 5 inches.

The major step portion preferably has a major effective front to back length, the sum of the major and minor effective front to back lengths being between about 9 and about 15 inches.

The sum of the first normal distance and the second normal distance is preferably between about 5 and 10 inches.

The treadmill or endless belt is typically mounted on the frame for rotation along a path of travel such that the generally planar surfaces of the major and minor step portions of successively interconnected stairs are disposed in a generally co-planar orientation along at least a portion of the path of travel of the treadmill or endless belt.

The treadmill or endless belt is preferably mounted for rotation such that the stairs travel in a backwardly downwardly directed path of travel on rotation of the treadmill, the major and minor portions of successively interconnected stairs providing a step surface on which a user can step with a user's foot during at least some portion of the backwardly downwardly directed path of travel of the stairs.

The treadmill is typically interconnected to a resistance device that exerts a selected degree of resistance to rotation of the treadmill, the treadmill being rotatably driven against the resistance by force of the user's weight WT or by the user's exertion of downwardly directed force on a step surface of one or more of the stairs.

The longitudinal axis of the path of travel is typically disposed at an angle of between about 30 and about 36 degrees relative to horizontal.

In another aspect of the invention there is provided a method of performing an exercise by a user using the apparatus of claim 1, the method comprising the user's stepping on a stair of the apparatus of claim 1 while the treadmill of the apparatus rotates in a backward and downward direction.

In another aspect of the invention there is provided a stair stepping apparatus comprising:

a plurality of stairs mounted on a frame and pivotably interconnected to each other in succession to form a treadmill or endless belt, the treadmill or endless belt being rotatably mounted on the frame for rotation around a path of travel, wherein each stair comprises:

a first link comprised of a major step portion joined to a minor riser portion by a rigid elbow, and a second link comprised of major riser portion joined to a minor step portion by a rigid elbow, the major step portion of each first link having a rearwardmost edge pivotably interconnected to a forwardmost edge of the minor step portion of the second link of a successively interconnected stair, the major riser portion of each second link having a rearwardmost edge pivotably interconnected to a forwardmost edge of the minor riser portion of the first link of a successively interconnected stair, the major step portion of the first link having a generally planar upper surface for receiving a sole of the user's foot, the forwardmost edge of the minor riser portion extending normally away from the generally planar surface of the major step portion, the minor step portion of the second link having a generally planar upper surface for receiving the sole of the user's foot, the rearwardmost edge of the major riser portion extending normally away from the generally planar surface of the major step portion.

The forwardmost edge of the minor riser portion typically extends a selected first normal distance away from a plane coincident with the generally planar surface of the major step portion, the rearwardmost edge of the major riser portion typically extends a selected second normal distance away from a plane coincident with the generally planar surface of the minor step portion.

The selected first normal distance is preferably between about 1 and about 5 inches.

The treadmill or endless belt is typically mounted on the frame for rotation along a path of travel such that the generally planar surfaces of the major and minor step portions of successively interconnected stairs are disposed in a generally co-planar orientation along at least a portion of the path of travel of the treadmill or endless belt.

The treadmill or endless belt is preferably mounted for rotation such that the stairs travel in a backwardly downwardly directed path of travel on rotation of the treadmill, the major and minor portions of successively interconnected stairs providing a step surface on which a user can step with a user's foot during at least some portion of the backwardly downwardly directed path of travel of the stairs.

The treadmill is typically interconnected to a resistance device that exerts a selected degree of resistance to rotation of the treadmill, the treadmill being rotatably driven against the resistance by force of the user's weight WT or by the user's exertion of downwardly directed force on a step surface of one or more of the stairs.

The path of travel has longitudinal axis preferably disposed at an angle of between about 30 and about 36 degrees relative to horizontal.

In another aspect of the invention there is provided a method of performing an exercise by a user using the apparatus of claim 14, the method comprising the user's stepping on a stair of the apparatus of claim 14 while the treadmill of the apparatus rotates in a backward and downward direction.

In another aspect of the invention there is provided a stair stepping apparatus comprising:

a plurality of stairs mounted on a frame and hingedly interconnected to each other in succession to form a treadmill or endless belt, the treadmill or endless belt being rotatably mounted on the frame for rotation around a path of travel, wherein each stair comprises:

a step having a generally planar upper step surface having a front to rear length extending from a front edge to a rear edge, the step being comprised of a front foot support and a rear foot support hingedly joined to each other between the front and rear edges of the upper step surface.

Each stair can further comprise a riser having a top to bottom vertical length extending from the rear edge of the upper step surface to a bottom edge of the riser, the riser comprising an upper riser and a lower riser hingedly joined to each other between the rear edge of the step surface and bottom edge of the riser.

The upper riser is preferably rigidly interconnected to the rear foot support at the rear edge of the upper step surface by an elbow that disposes the upper rise normally below the upper step surface, the lower riser being rigidly interconnected by an elbow to a front foot support of a successive step at the front edge of the upper step surface.

Each the front foot support typically has a front upper generally planar surface and the rear foot support has a rear upper generally planar surface, the treadmill or endless belt being mounted on the frame for rotation along a path of travel such that the front and rear foot supports pivot into a position where the front and rear upper generally planar surfaces are disposed in a generally co-planar orientation along at least a portion of the path of travel of the treadmill or endless belt.

The treadmill or endless belt is preferably mounted for rotation such that the stairs travel in a backwardly downwardly directed path of travel on rotation of the treadmill, the front and rear foot supports of successively interconnected stairs providing a step surface on which a user can step with a user's foot during at least some portion of the backwardly downwardly directed path of travel of the stairs.

The treadmill is preferably interconnected to a resistance device that exerts a selected degree of resistance to rotation of the treadmill, the treadmill being rotatably driven against the resistance by force of the user's weight or by the user's exertion of downwardly directed force on a step surface of one or more of the stairs.

The path of travel of the treadmill typically has a longitudinal axis disposed at an angle of between about 30 and about 36 degrees relative to horizontal.

In another aspect of the invention there is provided a method of performing an exercise by a user using the apparatus described immediately above, the method comprising the user's stepping on a stair of the apparatus while the treadmill of the apparatus rotates in a backward and downward direction.

The front foot support and the rear foot support of the apparatus described immediately above are typically hingedly joined by a male hinge disposed on one of the front and rear foot supports and a female hinge disposed on the other of the front and rear foot supports, the male hinge comprising a curved finger rotatably received within a complementary receiving aperture of the female hinge, the curved finger being adapted to rotate within and completely enclose the receiving aperture to form a continuous exterior surface between the female hinge and the male hinge at all angles of rotation of the male hinge within the receiving aperture.

In another aspect of the invention there is provided a stair stepping apparatus 5 comprising:

a plurality of stairs 70 mounted on a frame 10 and hingedly interconnected 72, 82 to each other in succession to form a treadmill or endless belt 20, the treadmill or endless belt being rotatably mounted on the frame for rotation BR around a path of travel, wherein each stair 70 comprises:

a step 50 having a generally planar upper step surface SS extending from a front edge 74f to a rear edge 50e and a riser 60 having an outside surface OS having a front edge 60e pivotably joined to the step 50 by a hinge 72 formed between the front edge 60e of the riser and the rear edge 50e of the step, the hinge 72 comprising at least one male hinge member 300 disposed on one of the rear edge 50e of the step and the front edge 60e of the riser and at least a pair of male hinge members 302 disposed on the other of the rear edge 50e of the step and the front edge 60e of the riser, the pair of male hinge members 302 being spaced apart to form an aperture or recess 7rr that is complementary to and receives the at least one male hinge member 300, each of the male hinge members 300, 302 comprising a center arcuate member 300c, 302c having an outside wall 300w, 302w that extends continuously from the upper step surface SS of the step and the outside surface OS of the riser at least about 180 degrees around the rear 50e and front 60e edges of the step 50 and the riser 60 respectively, each of the male hinge members 300, 302 further comprising a pair of lateral arcuate fingers 300f, 302f disposed on opposing lateral sides of the center arcuate member 300c, 302c, the lateral arcuate fingers 300f, 302f having an outside surface 300fw, 302fw that extends continuously from the upper step surface SS of the step 50 and from the outside surface OS of the riser about 90 degrees around the rear 50e and front edges 60e of the step and the riser, the male hinge members 300, 302 each having a longitudinal aperture 300ap, 302ap with a common axis APX for receiving a pin or rod 72p that extends through the longitudinal aperture 300ap, 302ap along the axis APX and pivotably interconnects the step 50 to the riser 60 forming the hinge 72, the longitudinal apertures 300ap, 302ap, the center arcuate members 300c, 302c and the lateral fingers 300f, 302f being adapted to arrange the outside wall 300w, 302w of the center arcuate member 300c, 302c and the outside surfaces 300fw, 302fw of the lateral arcuate fingers 300f, 302f such that a continuous surface is formed around the hinge when the step 50 and the riser 60 are pivoted relative to each other around at least 90 degrees.

BRIEF DESCRIPTION OF THE DRAWINGS

The above and further advantages of the invention may be better understood by referring to the following description in conjunction with the accompanying drawings in which.

DETAILED DESCRIPTION

Figure 1:
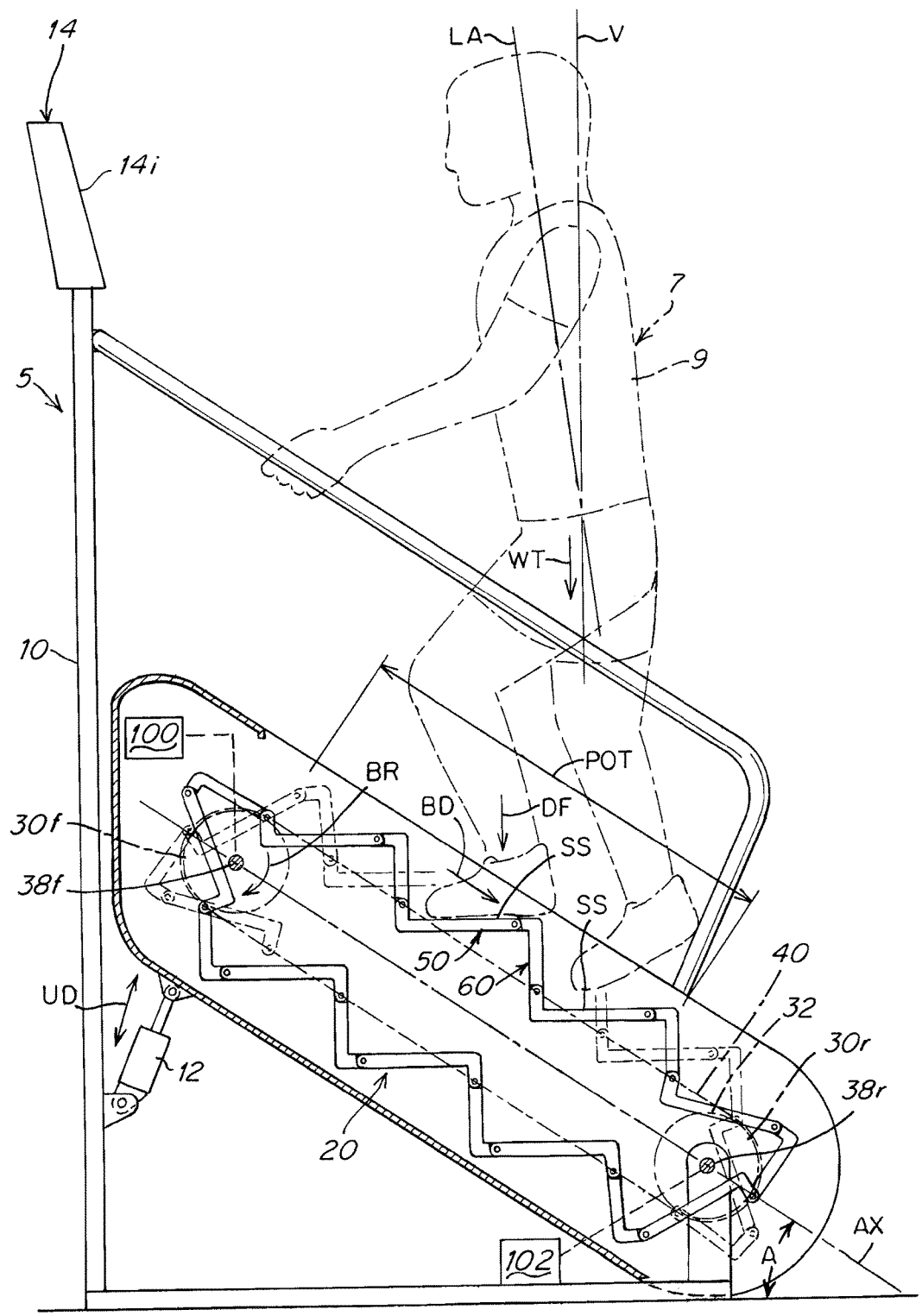
FIG. 1 is a side schematic view of a generic exercise stair stepper or climbing apparatus according to the invention showing the arrangement of a treadmill or belt of sequentially pivotably interconnected stairs and showing the generally upright disposition of a human being user climbing the stairs while the stairs rotate backwardly and downwardly in response to the user's exertion of force on the stairs.

FIG. 1 shows a stair climbing apparatus 5 comprised of a frame 10 on which is mounted a treadmill or endless belt 20 that has a rotation axis AX. The treadmill or belt 20 is mounted for rotation in a backwardly downwardly direction BD on pulleys 30 that drive the rotation of the treadmill 20 via gear teeth 32 adapted to mesh with complementary apertures in the links of chains, belts or the like 40 that support the individual forward link 50 and rearward link 60 of each stair via a rod 45 that extends between the drive chains 40, belts or the like that are meshed or driven by front and rear pulleys 30f, 30r.

The angle of incline A of the axis AX is selectively adjustable by the user 7 to any desired angle A relative to horizontal by conventional devices such as by way of a controller 14 having a manually operable user interface 14i, the controller 14 being interconnected to and containing instructions that controllably drive a motor or other drive device 12 that is mechanically interconnected to the treadmill assembly in a manner that controllably moves the front axle 38f or pulley 30f in a generally up and down UD direction relative to the rear axle 38r and rear pulley 30r.

Most preferably the instructions contained within the controller 14 enable the user 7 to adjust the angle A of the longitudinal axis AX to an angle that enable the user to perform a stepping exercise or motion or action as shown in FIG. 1 such that the longitudinal axis LA of the user's upper torso 9 is disposed in a generally vertical V orientation when the user's upper torso or spine is disposed in a generally straight orientation as shown in FIG. 1. Preferably the instructions contained within the controller 14 enable the longitudinal axis AX to be adjusted to an angle A of between about 30 and about 36 degrees, most preferably between about 32 and about 34 degrees.

Beginning from a start exercise motionless position of the treadmill or belt 20 at which point in time the treadmill is motionless, the treadmill 20 is held in a motionless position by an on-off brake 102 that prevents rotational movement of the pulleys 38r, 38f and the treadmill 20 until the on-off brake 102 is released by the user 7. Upon release of the on-off brake 102, movement of the treadmill or belt 20 is preferably resisted during a run-up from 0 rotational speed to X in rotational speed, X being a preselected rotational speed greater than zero, solely by drag, friction and weight of the moving mechanical components of the apparatus such as the treadmill 20, pulleys 30f, 30r, chains or belts 40 and associated components such as bearings and the like. Starting from the motionless position, the treadmill 20 can be rotatably driven upwards in rotational velocity BR in a backwardly downwardly BD direction by the user's stepping on a stair surface SS or by exerting the force of the user's weight WT or a downwardly user exerted force DF, FIG. 1 by the user's muscles. The apparatus 5 is adapted so that the treadmill 20 can be driven from 0 rotational speed upwardly to a preselected rotational speed BR at which preselected rotational speed a resistance device 100 begins to exert a resistance to rotation BR. The treadmill 20 is preferably interconnected to a resistance device 100, such as an eddy current brake device that exerts a resistance to rotation BR that increases exponentially or non-linearly with an increase of the rotational speed BR of the treadmill or belt 20.

As shown in FIGS. 1-4, the treadmill 20 is comprised of a plurality of serially or successively pivotably interconnected stairs 70, each stair comprising a forward link 50 and a rear link 60 that are pivotably or hingedly interconnected along a line 72 that extends across the width W of the step surface SS. The hinge along line 72 is formed by a series of complementary forward fingers 72ff (each comprised of lateral fingers 300f, FIGS. 12A, 12B) and forward recesses 72fr formed on rear edge of the forward link 50 that mate with a complementary series of rearward recesses 72rr and rearward fingers 72rf (each comprised of lateral fingers 302f) formed on a forward edge of the rear link 60. A connecting pin 72p is insertable through a complementary aperture PA provided in fingers 72ff and 72rf so as to pivotably connect the forward link 50 to the rear link 60 along the hinge line 72.

The step hinge line 72 is disposed some selected distance along the overall step length SL that extends between the forward edge 74f and the rear edge 74r of each step surface SS of each stair 70. The step surface SS is comprised of a forward step surface SSF formed on the upper surface of the forward link 50 and a rearward step surface SSR formed on the upper surface of the rear link 60. The forward SSF and rear SSR step surfaces are generally planar such that the two surfaces SSF and SSR form an overall step surface SS that is generally continuous and planar when the forward 50 and rear 60 links pivot into angular alignment with each other along a portion POT of the overall path of rotational travel of the treadmill 20.

Preferably, the hinge line 72 is spaced a distance RSL of between about 1 and about 5 inches from the rear edge 72 of a step surface SS. Typically, the overall length SL of a step surface is between about 10 and about 15 inches.

Figure 2:
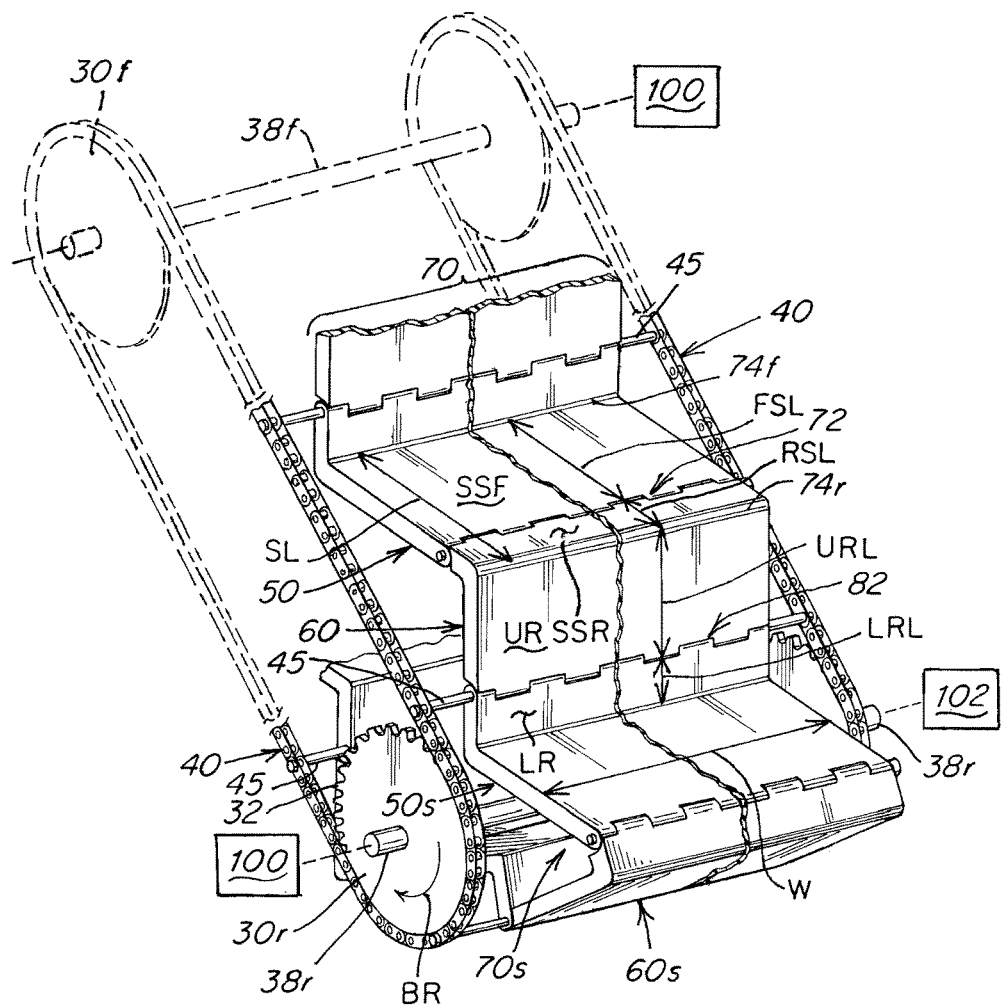
FIG. 2 is a top side perspective view of a series of pivotably interconnected stairs of the FIG. 1 apparatus.
Figure 2A:
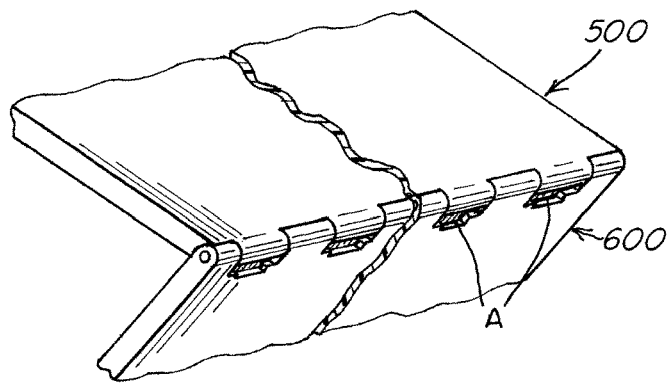
FIG. 2A is a top side perspective view of a prior art stair climber stair.
Figure 3:
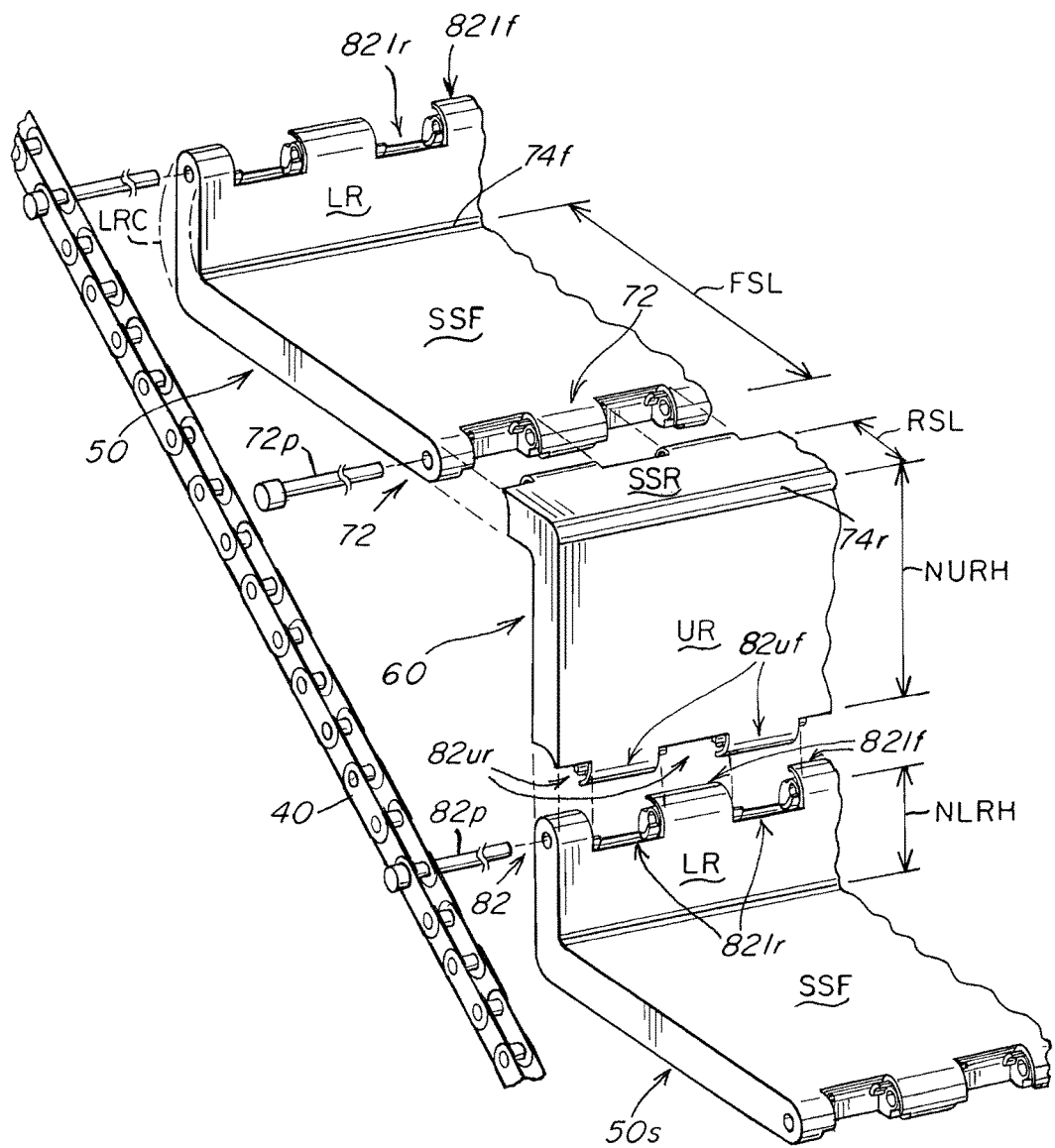
FIG. 3 is a top side perspective exploded view of the major stair and major riser components of a stair that makes up the treadmill of stairs of the FIGS. 1-2 apparatuses.

Each stair 70 is also comprised of an upper riser UR and a lower riser LR. The upper riser UR of each stair 70 extends downwardly from the rear edge 74r of the stair surface SS and terminates at a lower edge in a second hinge line 82 where the UR riser portion of the stair 70 pivotably interconnects to an upper edge of the lower riser LR portion of stair 70. The lower riser portion LR of stair 70 comprises an upward extension of the first link 50s of an immediately successive stair 70s to the immediately preceding stair 70 as shown in FIG. 2.

The lower riser LR extends upwardly from the forward step surface SSF such that the riser hinge line 82 of the lower riser is disposed a normal height or distance of between about 1 and about 5 inches above or away from the forward step surface SSF.

Similar to hinge line 72, the hinge is formed along riser hinge line 82 by the mating of complementary upper recesses 82uf formed on the lower edge of link 60 with lower riser fingers 82lf formed on the upper edge of the lower riser LR. A connecting pin 82p is insertable through a complementary aperture PA provided in fingers 82uf and 82lf so as to pivotably connect the forward link 50s to the rear link 60 along the hinge line 82.

Figure 4:
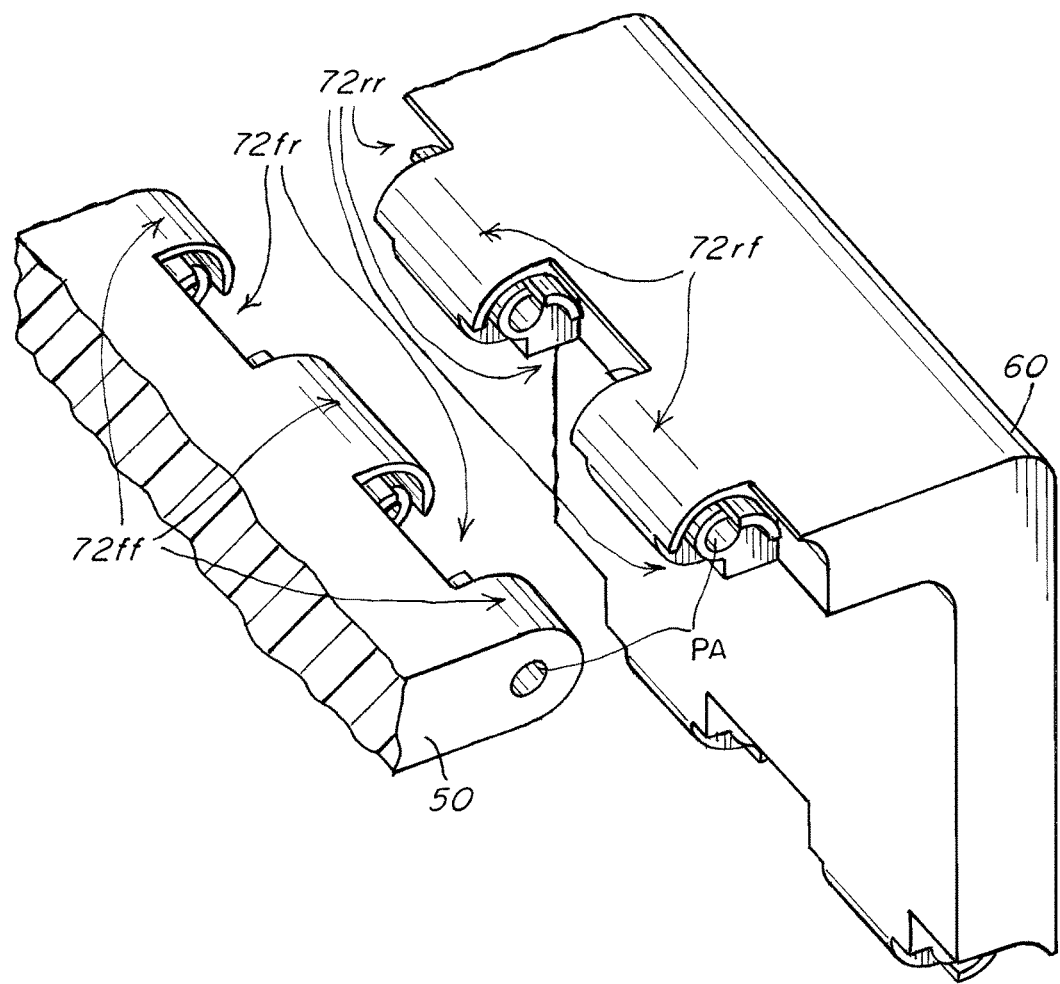
FIG. 4 is a top rear perspective exploded view of the components of FIG. 3 showing the details of a hinge mechanism that pivotably connect the front and rear step components of a stair.
Figure 5:
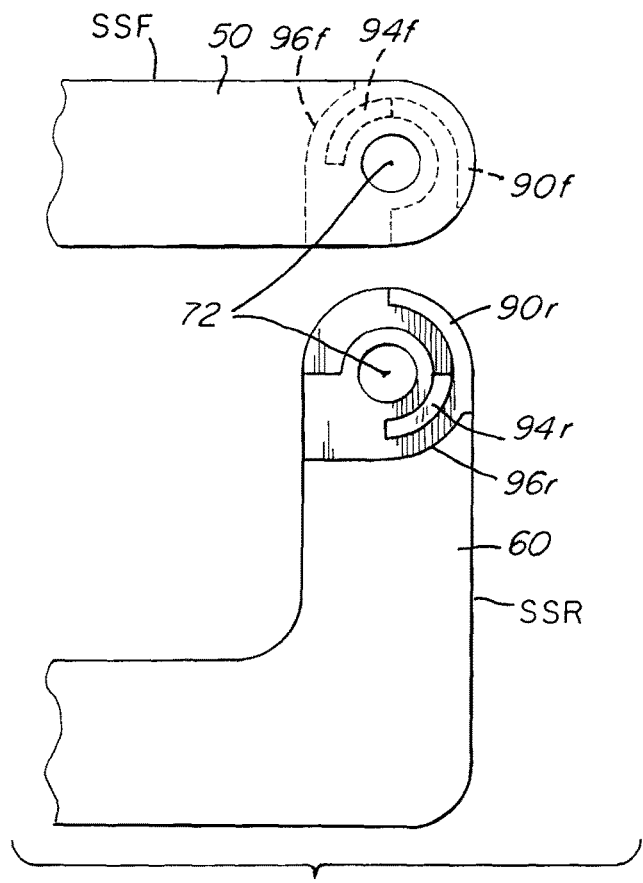
FIG. 5 is a side view of the FIG. 4 components when the components are disengaged from each other showing the details of the hinge.

FIG. 5 is a side view of the FIG. 4 components showing the forward and rear links disengaged from each other and showing details of the hinge components. The forward link 50 includes a series of forward fingers 72ff each having a curved connection portion 90f (shown in dashed lines). Forward link 50 also includes a series of forward recesses 72fr each having at least one curved guide unit 94f and a concave surface 96f (both shown in dashed lines). Similarly, the rear link 60 includes a series of rearward fingers 72rf each having a curved connection portion 90r. Furthermore, rear link 60 includes a series of rearward recesses 72rr each having at least one curved guide unit 94r and a concave surface 96r. The curved connection portions 90f and 90r angularly extend from the generally planar step surface toward the lower surface of the step. In some embodiments, the curved connection portions 90f and 90r can extend from the generally planar step surface along an arc between about 45 degrees and about 135 degrees.

Figure 6:
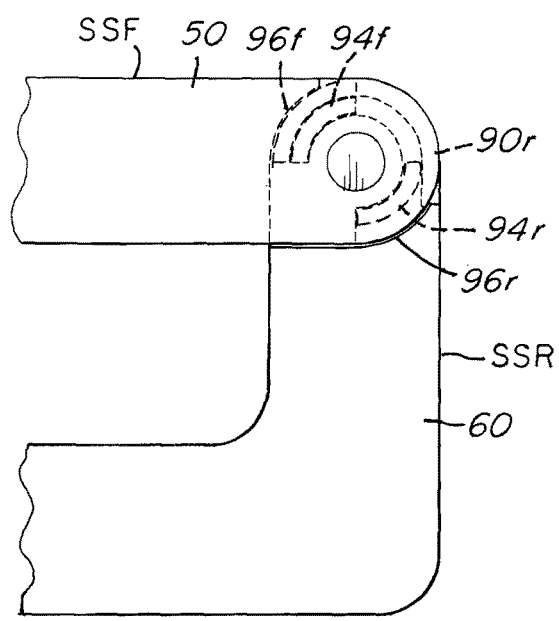
FIG. 6 is a side view of the FIG. 4 components when the components are connected by their hinge showing the components in an angular position where the upper step surfaces are angled at about 90 degrees relative to each other.
Figure 7:
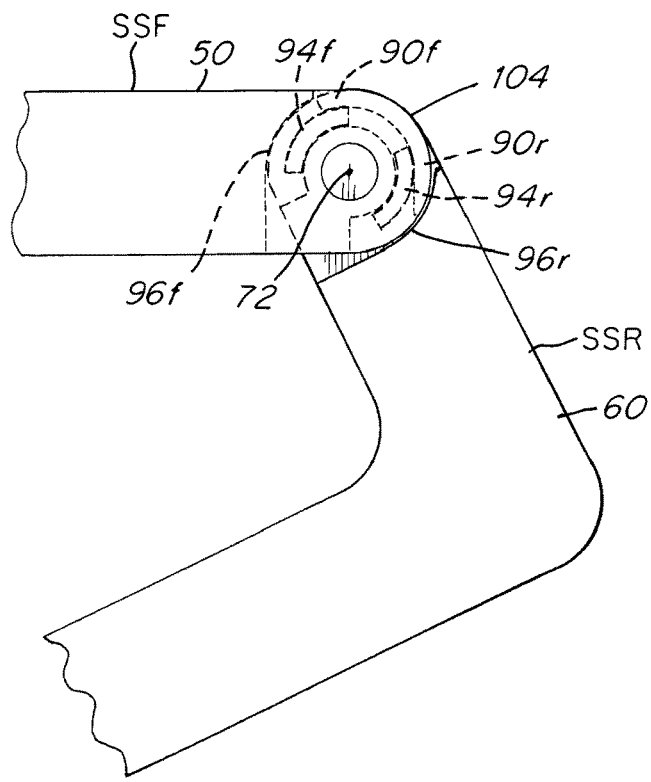
FIG. 7 is a side view of the FIG. 4 components when the components are connected by their hinge showing the components in an angular position where the upper step surfaces are angled at about 45 degrees relative to each other.
Figure 8:
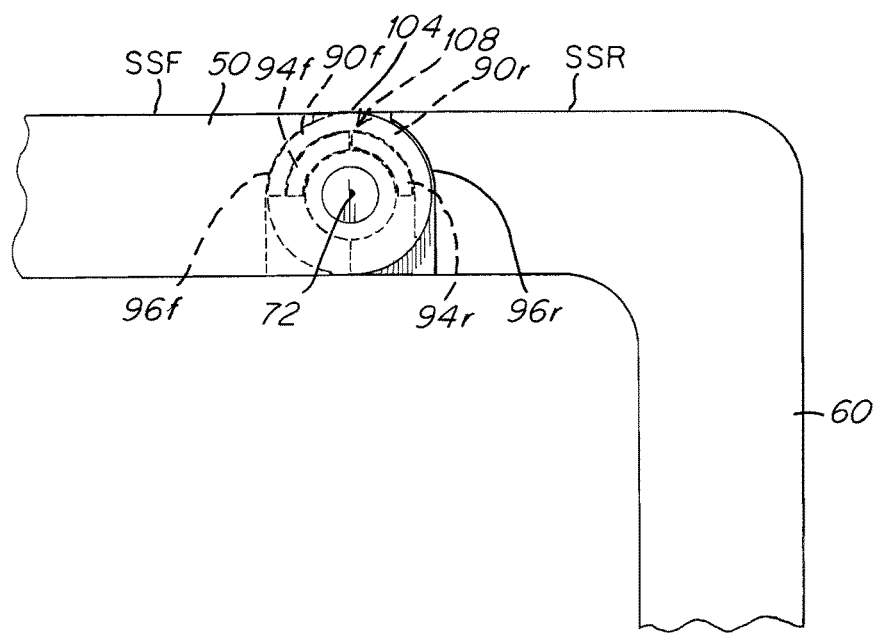
FIG. 8 is a view similar to FIGS. 6 and 7 showing the two step components in an angular position where the upper step surfaces are coplanar.

As shown in FIGS. 6-8, each of the curved connection portions is rotatably received between the complementary curved guide unit(s) and concave surface to pivotably interconnect the forward link 50 to the rear link 60 via forward and rearward fingers 72ff and 72rf. A connecting pin 72p is insertable through a complementary aperture PA provided in fingers 72ff and 72rf to secure the connection between the forward link 50 and the rear link 60 along the hinge line 72. Once connected, the forward and rearward fingers 72ff and 72rf completely enclose their complementary forward and rearward recesses to form a continuous exterior surface throughout all angles of rotation of the pivotable interconnection.

When the forward and rearward step surfaces are substantially perpendicular to one another, they can be connected by their hinge as shown in FIG. 6. Each curved connection portion 90f included in the forward fingers 72ff of the forward link 50 is rotatably received between the complementary curved guide unit(s) 94r and concave surface 96r included in the complementary rearward recess 72rr of the rear link 60. Similarly, each curved connection portion 90r in the rearward fingers 72rf disposed on the rear link 60 is rotatably received between the complementary curved guide unit(s) 94f and concave surface 96f in the complementary forward recess 72fr disposed on the forward link 50. Furthermore, FIG. 6 shows that each of the forward and rearward fingers 72ff and 72rf completely encloses their complementary forward and rearward recesses 72fr and 72rr to form a continuous exterior surface 104.

FIG. 7 is a side view showing the front and rear links in an angular position where the step surfaces are angled at about 45 degrees relative to each other. In comparison with FIG. 6, it can be seen that each of the curved connection portions 90f and 90r is further rotatably engaged between the complementary curved guide unit(s) and concave surface. Moreover, the forward and rearward recesses 72fr and 72rr remain completely enclosed by each of the forward and rearward fingers 72ff and 72rf thereby maintaining the continuous exterior surface 104.

FIG. 8 is a side view similar to FIGS. 6 and 7 showing the front and rear links in an angular position where the step surfaces are coplanar. In this configuration, each of the curved connection portions 90f and 90r is fully rotatably engaged between the complementary curved guide unit and concave surface. When the front and rear step components are coplanar, a radially inward protrusion in each of the curved connection portions 90f and 90r contacts a front face of the complementary curved guide unit to form an abutment 108. Furthermore, FIG. 8 shows that each of the forward and rearward fingers 72ff and 72rf still completely encloses their complementary forward and rearward recesses 72fr and 72rr and the continuous exterior surface 104 remains.

Figure 9:
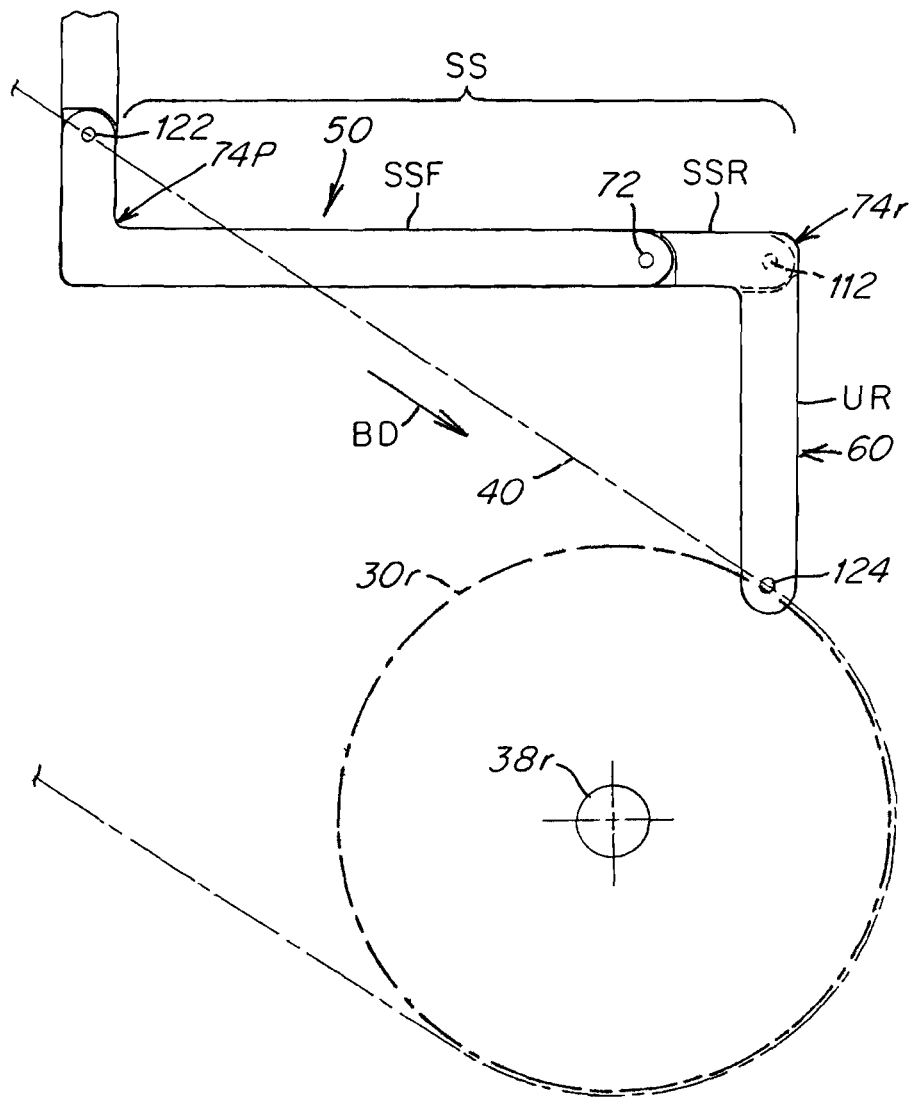
FIG. 9 is a side schematic view of a stair with a hinge disposed on the rear edge and a stair with a hinge disposed a selected distance along the step surface.
Figure 10:
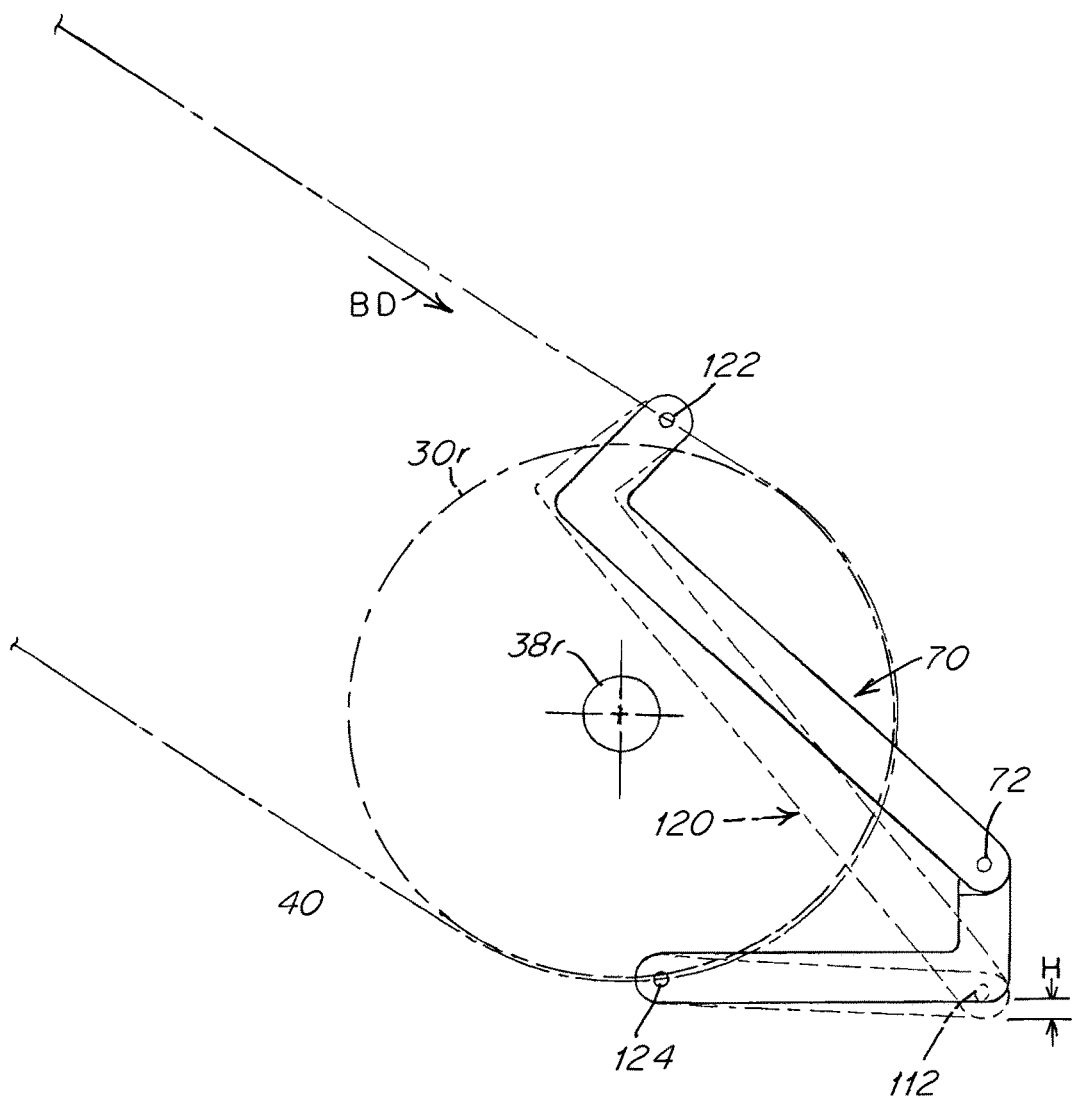
FIG. 10 is a side schematic view similar to FIG. 9 showing a second position of the two stairs with different hinge locations.
Figure 11:
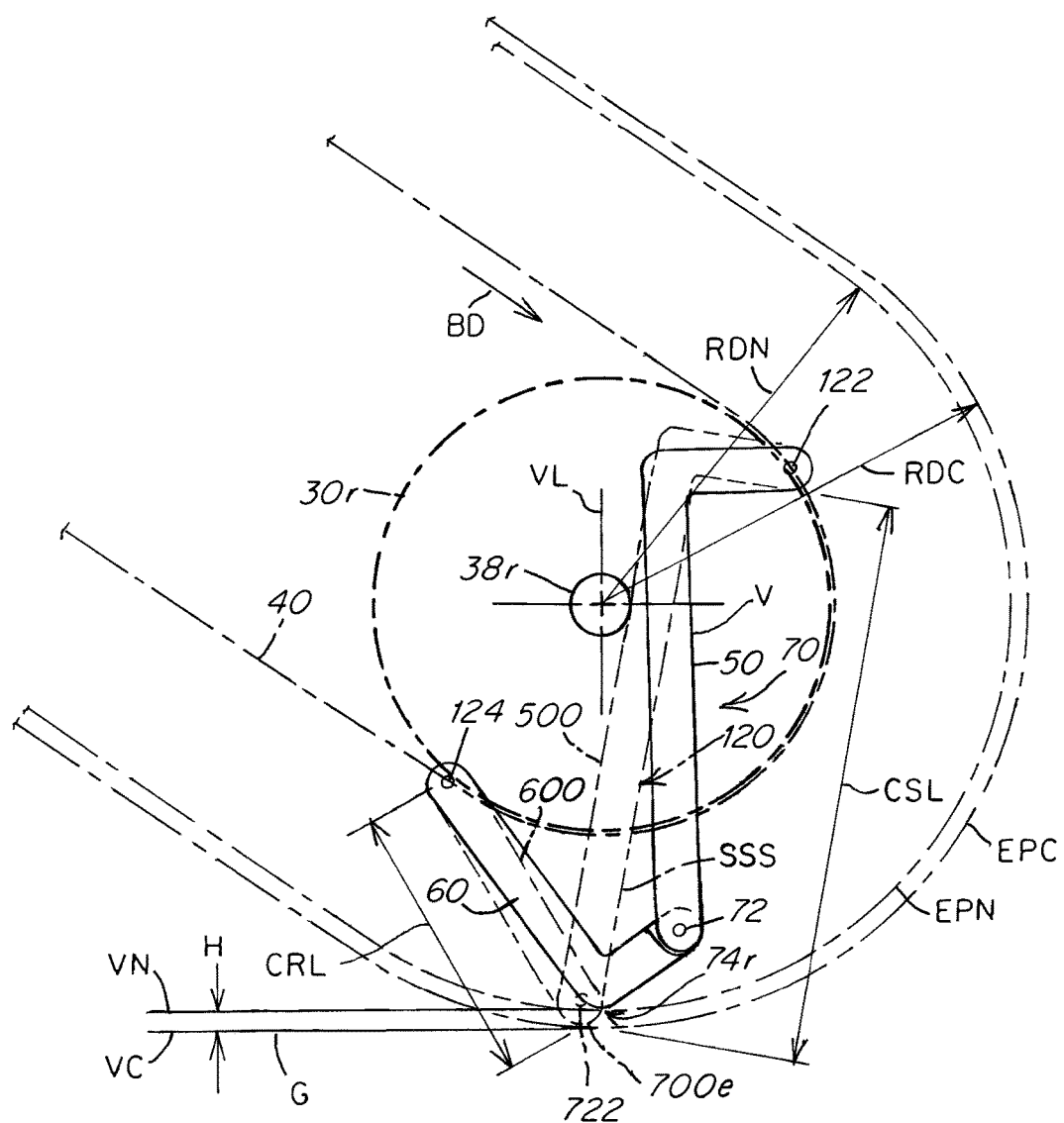
FIG. 11 is a side schematic view of a single stair of the apparatus of FIGS. 1-10, the stair shown mounted on a chain that is driven by the pulley, FIG. 11 showing the path of travel EPN of the outermost edge 74r of a stair according the FIGS. 1-10 embodiment of the invention and the path of travel EPC of the outermost edge 700e of a conventional treadmill stair 500, 600.

FIGS. 9, 10 and 11 show a comparison between stair 70 having a hinge disposed along hinge line 72 and a stair 120 (shown in dashed lines) having a hinge disposed along hinge line 112. Hinge line 72 is disposed some selected distance along the overall step length that extends between the forward edge 74f and the rear edge 74r of the step surface of stair 70. On the other hand, hinge line 112 is disposed on the rear edge 74r of the step surface. Each of stairs 70 and 120 are pivotably connected to a belt or chain 40 at points 122 and 124 and are configured to move along a path outlined by belt or chain 40 in a backward and downward direction BD.

FIG. 9 illustrates a first stair position in which both stair 70 and stair 120 form a generally continuous and planar step surface. As a user steps on the step surface of stairs 70 and 120, the user's weight or a downwardly user exerted force causes each of stairs 70 and 120 to move in a backward and downward direction BD into a second stair position illustrated in FIG. 10. In the second stair position, stairs 70 and 120 have pivoted about their respective hinge lines 72 and 112 to accommodate the path outlined by the chain or belt 40. Due to the difference in the position of hinge lines 72 and 112, stair 120 extends a distance H below stair 70.

FIG. 11 shows in schematic a single stair 70 of the apparatus of FIGS. 1-10 mounted on a chain 40 that is driven by the pulley 30r and in particular the path of travel EPN of the outermost edge 74r of a stair 70 according the FIGS. 1-10 apparatus relative to the path of travel EPC of the outermost edge 700e of a conventional treadmill stair 500, 600. As shown, the radial distance RDN to which the outermost edge 74r of a stair 70 according to the invention extends from the center of the pulley 38r is significantly reduced or less relative to the radial distance RDC to which the outermost edge of a conventional stair 500, 600 extends where the conventional stair 500, 600 has about the same step length CSL and riser length CRL as the step length (FSL plus RSL) and riser length (URL plus LRL) of a stair 70 according to the invention. Such a reduction in distance of extension RDN relative to conventional stair distance of extension RDC. Such reduction in extension RDN in particular reduces the vertical height H of the outermost edge 74R of the stair 70 off of the ground G when a stair 70 is in its closest to ground G position at the most vertical V disposition over the course of rotation of the treadmill 20 around its angled path of travel. Such reduction and thus reduces the minimum height off of the ground by which the stair surface SS can be mounted which in turn reduces the overall height of the apparatus relative to ground G and the height off the ground that a user must step up in order to step on the lowest stair on the treadmill 20 when the apparatus 5 is mounted on the frame 10.

Figure 12A:
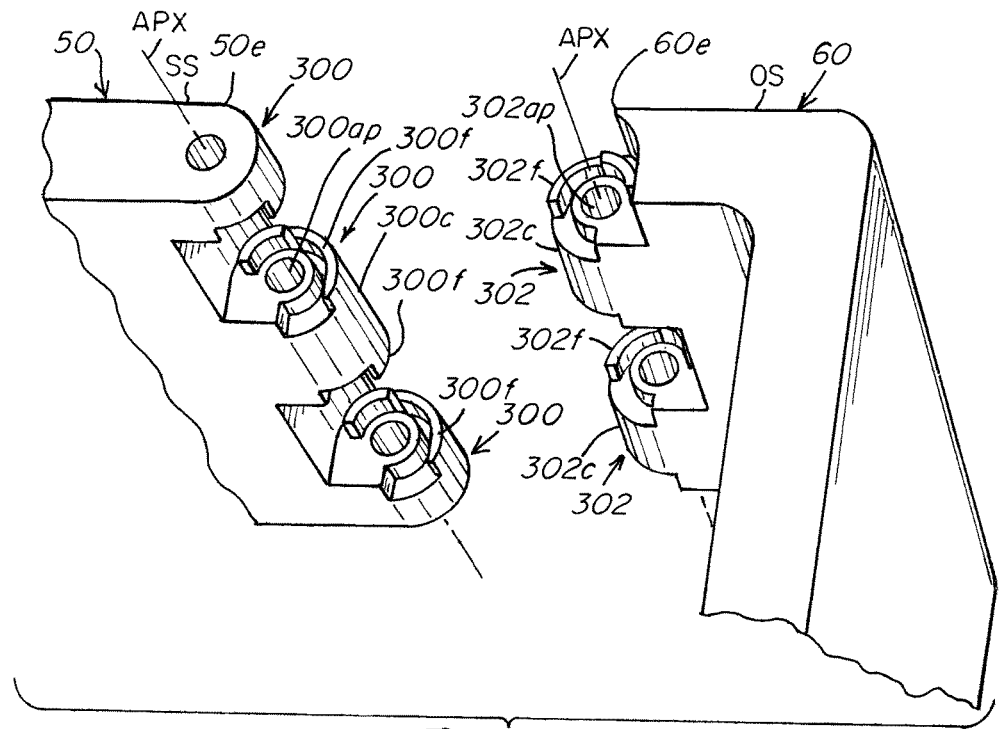
FIG. 12A is an enlarged bottom perspective exploded view of the rear and front edges of the forward and rear links of a stair according to the FIGS. 1-10 embodiment showing the details of a preferred hinge structure.
Figure 12B:
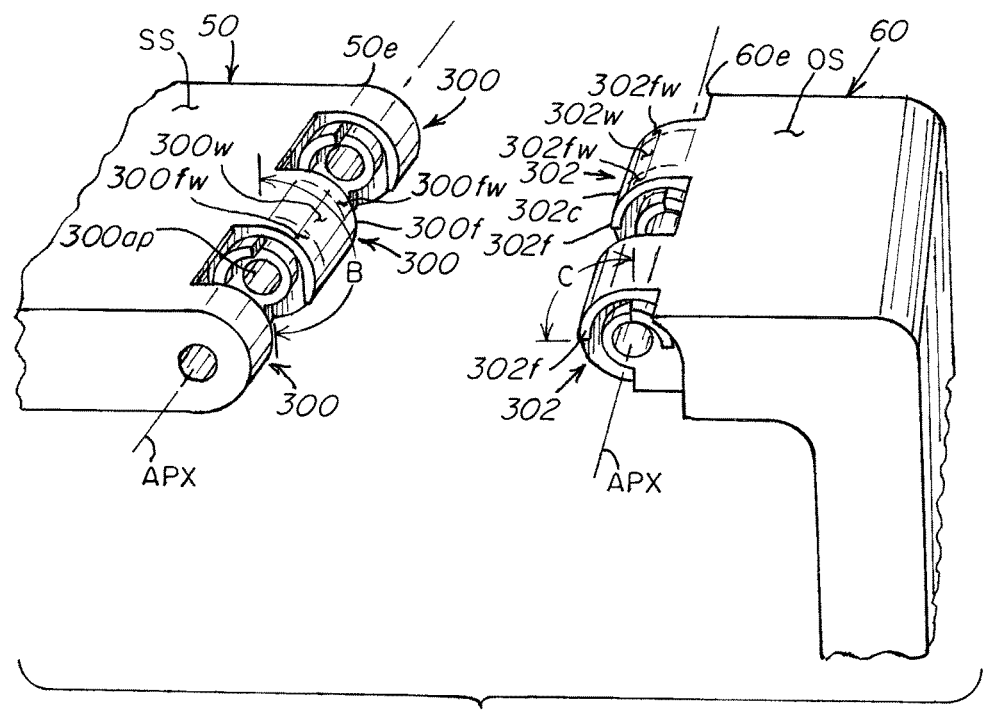
FIG. 12B is an enlarged top perspective exploded view of the rear and front edges of the forward and rear links of a stair according to the FIGS. 1-10 embodiment showing the details of a preferred hinge structure.

FIGS. 12A, 12B show the details of a preferred hinge 72 structure of an apparatus 5 according to the invention. As shown the hinge 72 comprises at least one male hinge member 300 disposed on one of the rear edge 50e of the step and the front edge 60e of the riser and at least a pair of male hinge members 302 disposed on the other of the rear edge 50e of the step and the front edge 60e of the riser, the pair of male hinge members 302 being spaced apart to form an aperture or recess 7rr that is complementary to and receives the at least one male hinge member 300.

Each of the male hinge members 300, 302 comprises a center arcuate member 300c, 302c having an outside wall 300w, 302w that extends continuously from the upper step surface SS of the step and the outside surface OS of the riser at least about 180 degrees (angle B) around the rear 50e and front 60e edges of the step 50 and the riser 60 respectively.

Each of the male hinge members 300, 302 further comprises a pair of lateral arcuate fingers 300f, 302f disposed on opposing lateral sides of the center arcuate member 300c, 302c, the lateral arcuate fingers 300f, 302f having an outside surface 300fw, 302fw that extends continuously from the upper step surface SS of the step 50 and from the outside surface OS of the riser about 90 degrees (angle C) around the rear 50e and front edges 60e of the step and the riser. The male hinge members 300, 302 each have a longitudinal aperture 300ap, 302ap with a common axis APX for receiving a pin or rod 72p that extends through the longitudinal aperture 300ap, 302ap along the axis APX and pivotably interconnects the step 50 to the riser 60 forming the hinge 72. The longitudinal apertures 300ap, 302ap, the center arcuate members 300c, 302c and the lateral fingers 300f, 302f are adapted to arrange the outside wall 300w, 302w of the center arcuate member 300c, 302c and the outside surfaces 300fw, 302fw of the lateral arcuate fingers 300f, 302f such that a continuous surface is formed around the hinge when the step 50 and the riser 60 are pivoted relative to each other around at least 90 degrees.

What is claimed is:

1. A stair stepping apparatus comprising: a plurality of stairs mounted on a frame and hingedly interconnected to each other in succession to form a treadmill, the treadmill being rotatably mounted on the frame for rotation around a path of travel, wherein each stair comprises: a step comprising a foot support having a generally planar upper step surface having a front to rear length extending from a front edge to a rear edge, the upper step surface being comprised of a forward step surface and a rearward step surface between the front edge and the rear edge; a riser having a top to bottom vertical length, extending from the rear edge of the upper step surface to a bottom edge of the riser, the step and the riser hingedly joined to each other at the rear edge of the upper step surface; and the forward step surface and the rearward step surface hingedly joined to each other between the front edge of the upper step surface and rear edge of the upper step surface.

2. The stair stepping apparatus of claim 1, wherein a top end of the riser is rigidly interconnected to the foot support at the rear edge of the upper step surface by an elbow that disposes the riser normally below the upper step surface, and a bottom end of the riser being rigidly interconnected by an elbow to a foot support of a successive step at the front edge of the upper step surface.

3. The stair stepping apparatus of claim 1 wherein the foot support pivots into a position where the generally planar upper surface is disposed in a generally co-planar orientation along at least a portion of the path of travel of the treadmill.

4. The apparatus of claim 1, wherein the stairs travel in a backwardly downwardly directed path of travel on rotation of the treadmill, the foot supports of successively interconnected stairs providing the upper step surface on which a user can step with a user's foot during at least some portion of the backwardly downwardly directed path of travel of the stairs.

5. The apparatus of claim 1, wherein the treadmill is interconnected to a resistance device that exerts a selected degree of resistance to rotation of the treadmill, the treadmill being rotatably driven against the resistance by force of the user's weight or by the user's exertion of downwardly directed force on the upper step surface of one or more of the stairs.

6. The apparatus of claim 1, wherein the path of travel of the treadmill has a longitudinal axis disposed at an angle of between about 30 and about 36 degrees relative to horizontal.

7. The apparatus of claim 1, wherein the step and the riser are hingedly joined to each other at a hinge disposed on the rear edge of the upper step surface.

8. The apparatus of claim 1, wherein the step and the riser are hingedly joined by a male hinge disposed on one of the step and the riser and a female hinge disposed on the other of the step and the riser, the male hinge comprising a curved finger rotatably received within a complementary receiving aperture of the female hinge, the curved finger being adapted to rotate within and completely enclose the receiving aperture to form a continuous exterior surface between the female hinge and the male hinge at all angles of rotation of the male hinge within the receiving aperture.

9. A method of performing an exercise by a user using the apparatus of claim 1, the method comprising the user's stepping on the upper step surface of the stair while the treadmill rotates in a backward and downward direction.

10. The stair stepping apparatus of claim 1, wherein the path of travel has an axis oriented at an angle of incline relative to horizontal, and further comprising: a controller having a user interface that is manually operable by a user to adjust the angle of incline.

11. The stair stepping apparatus of claim 10, wherein the axis of the path of travel is disposed at an angle of between 30 and 36 degrees relative to horizontal.

12. A stair stepping apparatus comprising: a plurality of stairs mounted on an endless belt or treadmill in succession, the treadmill or endless belt being rotatably mounted on a frame for rotation around a path of travel, the path of travel having an axis oriented at an angle of incline relative to horizontal, and a controller having a user interface, the controller mounted at a forward end of the apparatus; and: each stair comprises a stepping surface comprising a forward step surface and a rearward step surface pivotably interconnected at a hinge line; and the user interface is manually operable by a user to adjust the angle of incline of the axis of the path of travel.

13. A stair stepping apparatus comprising: a plurality of stairs and a plurality of risers interspersing the plurality of stairs, the plurality of stairs and the plurality of risers mounted on an endless belt or treadmill in succession, the treadmill or endless belt being rotatably mounted on a frame for rotation around a path of travel, wherein: each stair comprises a stepping surface comprising a forward step surface and a rearward step surface pivotably interconnected at a hinge line; and each riser comprises a generally planar surface oriented perpendicularly to the stepping surface for at least a portion of the path of travel.

* * * * *